United States Patent
Won et al.

(10) Patent No.: US 10,910,659 B2
(45) Date of Patent: Feb. 2, 2021

(54) METHOD AND SYSTEM FOR DIAGNOSING STATE OF FUEL CELL

(71) Applicants: Hyundai Motor Company, Seoul (KR); Kia Motors Corporation, Seoul (KR)

(72) Inventors: Sangbok Won, Seoul (KR); Young Bum Kum, Seoul (KR); Kwi Seong Jeong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 9 days.

(21) Appl. No.: 16/299,756

(22) Filed: Mar. 12, 2019

(65) Prior Publication Data

US 2019/0229358 A1    Jul. 25, 2019

Related U.S. Application Data

(62) Division of application No. 15/264,037, filed on Sep. 13, 2016, now Pat. No. 10,276,884.

(30) Foreign Application Priority Data

Dec. 14, 2015 (KR) .......................... 10-2015-0178293

(51) Int. Cl.
*H01M 8/04992* (2016.01)
*H01M 8/04537* (2016.01)

(52) U.S. Cl.
CPC ... *H01M 8/04992* (2013.01); *H01M 8/04552* (2013.01); *H01M 8/04641* (2013.01); *H01M 2250/20* (2013.01); *Y02T 90/40* (2013.01)

(58) Field of Classification Search
CPC .............. H01M 8/04; H01M 8/04992; H01M 8/04537; H01M 8/04641; H01M 8/04552
See application file for complete search history.

(56) References Cited

U.S. PATENT DOCUMENTS

| 8,241,802 B2 | 8/2012 | Manabe et al. |
| 8,889,309 B2 | 11/2014 | Manabe et al. |
| 2010/0015474 A1* | 1/2010 | Dinan ............... H01M 8/04992 429/432 |

FOREIGN PATENT DOCUMENTS

| JP | 2008-010176 A | 1/2008 |
| JP | 2008-135372 A | 6/2008 |
| JP | 2011-192419 A | 9/2011 |
| JP | 2013-258043 A | 12/2013 |

* cited by examiner

*Primary Examiner* — Karie O'Neill Apicella
(74) *Attorney, Agent, or Firm* — Mintz Levin Cohn Ferris Glovsky and Popeo, P.C.; Peter F. Corless

(57) ABSTRACT

A method and system for diagnosing a state of fuel cell are provided. The system includes a signal measurement unit that has a high pass filter with a predetermined cut-off frequency and a voltage measurement circuit, and that measures a first AC voltage to measure the fuel cell state diagnosis signal and a noise measurement unit including a band pass filter that has a predetermined pass band and a voltage measurement circuit, and that measures a second AC voltage to measure the fuel cell state diagnosis noise. A controller calculates a signal to noise ratio (SNR) of fuel cell state diagnosis data based on the first and second AC voltages, determines the corresponding fuel cell state diagnosis data to be reliable when the SNR value is greater than a predetermined reference value, and applies the fuel cell state diagnosis data to a control of a fuel cell vehicle.

4 Claims, 15 Drawing Sheets

METHOD AND SYSTEM FOR DIAGNOSING STATE OF FUEL CELL

CROSS-REFERENCE TO RELATED APPLICATION

This application is a divisional of U.S. patent application Ser. No. 15/264,037 filed on Sep. 13, 2016 which claims priority to and the benefit of Korean Patent Application No. 10-2015-0178293 filed in the Korean Intellectual Property Office on Dec. 14, 2015, the entire contents of which are incorporated herein by reference.

BACKGROUND

(a) Field of the Invention

The present invention relates to a method and system for diagnosing a state of a fuel cell, and more particularly, to a method and system for diagnosing a state of a fuel cell to improve the reliability of diagnosis by calculating a signal to noise ratio.

(b) Description of the Related Art

Generally, a fuel cell includes an electrode that provokes an electrochemical reaction, a polymer electrolyte membrane that transfers hydrogen ions generated by the reaction and a separator that supports the electrode and the polymer electrolyte membrane. The polymer electrolyte fuel cell (hereinafter, referred to a fuel cell) has merits in that the fuel cell is high in efficiency compared with other shapes of fuel cells, great in the current density and the output density, the ignition time is short, and at the same time, it is not corroded nor required for the regulation of electrolyte since the polymer electrolyte fuel cell uses solid electrolyte. In addition, since the fuel cell is an environmentally friendly power source that produces no exhaust except only pure water, currently research is being conducted in automobile industries.

Commonly, the fuel cell life span and performance are influenced by the driving condition of the fuel cell. Accordingly, in the related industry, the diagnosis of fuel cell state is performed to obtain the information for maintaining the driving condition of the fuel cell in the optimal condition. Generally, the method for diagnosing the state of fuel cell includes a method of measuring the current-voltage curve and a method of measuring the impedance of the fuel cell. The measurement of fuel cell impedance is commonly measured by flowing alternating current (AC) current through the fuel cell or calculating the impedance of the fuel cell by outputting AC current from the fuel cell and measuring AC voltage of the fuel cell. In particular, the following relation is established generally.

$$\frac{V_{ac}(f)}{I_{ac}(f)} = Z(f) \qquad \text{Equation 1}$$

wherein, $V_{ac}(f)$ represents the AC voltage of the fuel cell at frequency f, $I_{ac}(f)$ represents the AC current of the fuel cell at frequency f, and $Z(f)$ represents the impedance of the fuel cell at frequency f. Meanwhile, it is common that the voltage of the fuel cell changes significantly by acceleration and deceleration of the fuel cell vehicle. The voltage spectrum of the fuel cell spreads to a wide range. In addition, owing to the operation frequencies of the motor, the inverter and the converter mounted on the fuel cell vehicle, the voltage of the fuel cell has the spectrum of very diverse and irregular.

Accordingly, when the spectrum of the fuel cell voltage and the frequency range for diagnosing the fuel cell state are overlapped, the reliability of diagnosis is degraded by increasing the measurement error of the diagnosis of the fuel cell. In the fuel cell vehicle environment, an effort for improving the accuracy of the fuel cell impedance measurement has been conducted since the performance, the durability and the usability of the fuel cell is related to the fuel cell state. However, more reliable measurement technique of the fuel cell impedance is needed since the conventional measurement technique of impedance has a problem of degrading reliability due to the big measurement error of diagnosing the fuel cell state due to the problems described above.

The above information disclosed in this section is merely for enhancement of understanding of the background of the invention and therefore it may contain information that does not form the prior art that is already known in this country to a person of ordinary skill in the art.

SUMMARY

The exemplary embodiments of the present invention is to provide a method and system for diagnosing a state of fuel cell, which may improve the reliability of diagnosing the state of fuel cell by calculating a signal to noise ratio (SNR) by defining the frequency band neighboring the signal except the diagnosis signal frequency of the fuel cell state as a noise region and using the calculated SNR for vehicle control when the SNR is greater than a reference value to improve the reliability of diagnosing the state of fuel cell.

A system for diagnosing a state of fuel cell according to an exemplary embodiment of the present invention may include a signal measurement unit having a high pass filter with a predetermined cut-off frequency and a voltage measurement circuit, and configured to measure a first AC voltage for measuring the fuel cell state diagnosis signal; a noise measurement unit having a band pass filter with a predetermined pass band and a voltage measurement circuit, and configured to measure a second AC voltage for measuring the fuel cell state diagnosis noise; and a controller configured to calculate a signal to noise ratio (SNR) of fuel cell state diagnosis data based on the first AC voltage and the second AC voltage, determine the corresponding fuel cell state diagnosis data to be reliable when the SNR value is greater than a predetermined reference value, and apply the fuel cell state diagnosis data to a control of a fuel cell vehicle.

When the SNR value is less than the reference value, the controller may discard the fuel cell state diagnosis data. The noise measurement unit may define the band neighboring the signal frequency except the fuel cell state diagnosis signal frequency to be a noise region. The controller may further be configured to calculate the SNR by dividing the signal region of the first AC voltage by the noise region of the second AC voltage. The signal measurement unit may have the cut-off frequency of about 980 Hz that is close to the state diagnosis frequency 1 kHz, thereby removing a hum noise caused by the noise near to the fuel cell state diagnosis frequency.

A system for diagnosing a state of fuel cell according to an exemplary embodiment of the present invention may include a signal measurement unit having a high pass filter with a predetermined cut-off frequency and a voltage measurement circuit, and configured to measure a first AC voltage for measuring the fuel cell state diagnosis signal; a noise measurement unit configured to measure a high voltage of a fuel cell through a voltage dividing circuit, and measure a second AC voltage for measuring the fuel cell state diagnosis noise; and a controller configured to calculate a signal to noise ratio (SNR) of fuel cell state diagnosis data based on the first AC voltage and the second AC voltage, determine the corresponding fuel cell state diagnosis data to be reliable when the SNR value is greater than a predetermined reference value, and apply the fuel cell state diagnosis data to a control of a fuel cell vehicle.

The noise measurement unit may be configured to measure a voltage deviation that is a difference between a maximum voltage value and a minimum voltage value among the second AC voltage values. The controller may be configured to determine the corresponding fuel cell state diagnosis data to be reliable when the voltage deviation is less than a predetermined reference deviation while the SNR value is greater than a predetermined reference value. The noise measurement unit may further be configured to measure the high voltage of fuel cell by decreasing the voltage through the voltage dividing circuit.

A system for diagnosing a state of fuel cell according to an exemplary embodiment of the present invention may include an integrated measurement unit having a high pass filter with a predetermined cut-off frequency and a voltage measurement circuit, and configured to measure a first AC voltage for measuring the fuel cell state diagnosis signal and a second AC voltage for measuring the fuel cell state diagnosis noise; and a controller configured to calculate a signal to noise ratio (SNR) of fuel cell state diagnosis data based on the first AC voltage and the second AC voltage, determine the corresponding fuel cell state diagnosis data to be reliable when the SNR value is greater than a predetermined reference value, and apply the fuel cell state diagnosis data to a control of a fuel cell vehicle.

A method for diagnosing a state of fuel cell by a system for diagnosing a state of fuel cell according to an exemplary embodiment of the present invention may include measuring a first AC voltage for measuring the fuel cell state diagnosis signal by collecting fuel cell voltage signals greater than a predetermined cut-off frequency; measuring a second AC voltage for measuring the fuel cell state diagnosis noise by collecting fuel cell voltage signals of a predetermined pass band; calculating a signal to noise ratio (SNR) of fuel cell state diagnosis data based on a signal region of the first AC voltage and a noise region of the second AC voltage; and determining the corresponding fuel cell state diagnosis data to be reliable when the SNR value is greater than a predetermined reference value, and applying the fuel cell state diagnosis data to a control of a fuel cell vehicle.

In the calculation of the signal to noise ratio (SNR) of fuel cell state diagnosis data, the SNR may be calculated by defining the band neighboring the signal frequency except the fuel cell state diagnosis signal frequency to be the noise region. The method may further include measuring a voltage deviation that is a difference between a maximum voltage value and a minimum voltage value among the second AC voltage values. The method may further include comparing the voltage deviation with a predetermined reference deviation while the SNR value is greater than the predetermined reference value; and determining the corresponding fuel cell state diagnosis data to be reliable when the voltage deviation is less than the predetermined reference deviation. In addition, the method may include discarding the fuel cell state diagnosis data when the SNR value is less than the reference value.

According to the exemplary embodiments of the present invention, the reliability of fuel cell state diagnosis may be improved by calculating the SNR value of the fuel cell state diagnosis data which are calculated through the respective measurement voltages of the signal measurement unit and the noise measurement unit and applying the state diagnosis data to the vehicle diagnosis and control when the SNR value is greater than a predetermined value. In addition, the noise related to accurate diagnosis may be removed by determining the state diagnosis data that satisfies the condition that the voltage deviation of the noise is less than the predetermined reference deviation to be reliable. Furthermore, by improving the reliability of fuel cell state diagnosis data through the fuel cell voltage measurement scheme, the control performance and durability of the fuel cell vehicle may be improved and the customer satisfaction measurement may be increased.

BRIEF DESCRIPTION OF THE DRAWINGS

The above and other objects, features and other advantages of the present invention will be more clearly understood from the following detailed description when taken in conjunction with the accompanying drawings, in which.

DESCRIPTION OF SYMBOLS

Figure 1A:
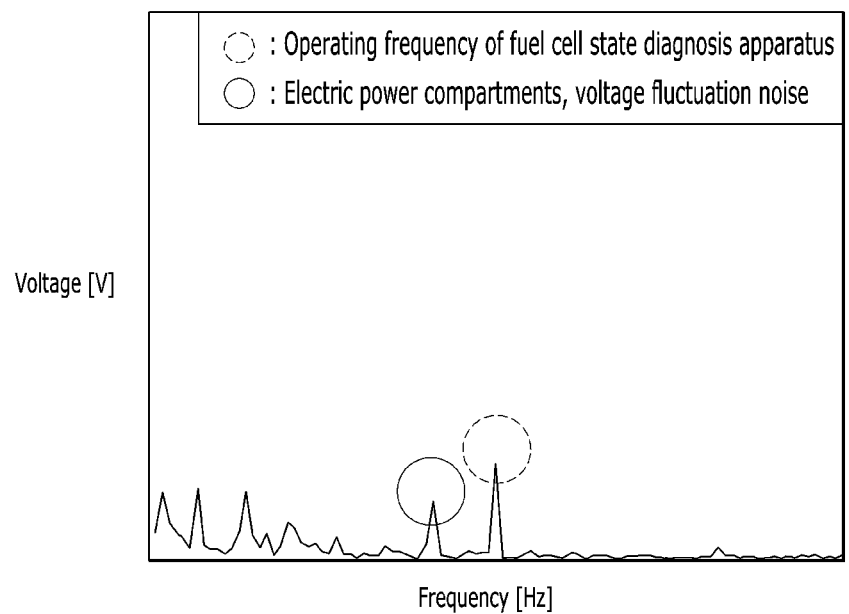
FIG. 1A-1B illustrate operation frequency due to the conventional electric power compartments according to the related art.

100: fuel cell state diagnosis system
110: fuel cell

120: signal measurement unit
130: noise measurement unit
140: controller
150: integrated measurement unit

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, by reference to the accompanying drawings, the exemplary embodiments of the present invention will be described in detail such that an ordinary skilled person in this art may easily implement. However, the present invention may be implemented in various forms, and the scope of the present invention is not limited to the embodiments described herein. And, in the drawings, to clearly describe the present invention, parts which are not in relation to the description are omitted, and the same reference numerals are designated for identical or similar elements throughout the specification.

When a part "includes" a certain element, this means that the part may not exclude other elements but further include them throughout the specification, unless any specific opposite description is presented. In addition, the term such as "part", "unit", "module", etc. described in the specification means a unit that processes at least one function or operation, and may be implemented by hardware, software or the combination thereof. Throughout the specification, the parts shown by identical reference numerals represent the identical elements.

Now, a method and apparatus for measuring voltage for diagnosing the fuel cell state according to an exemplary embodiment of the present invention will be described in detail by reference to the accompanying drawings. Before describing the present invention, the cause of degrading the accuracy of measuring the impedance of fuel cell when driving a fuel cell vehicle will be described. The degrading of the accuracy of measuring the impedance of fuel cell when driving a fuel cell vehicle is rooted in the noise due to electric power compartments and the noise due to the stack voltage fluctuation according to acceleration/deceleration of the vehicle.

First, the noise due to electric power compartments may be caused by the compartments including a high voltage direct current-direct current (DC-DC) converter, a low voltage DC-DC converter and an inverter. Such electric power compartments have irregular operation frequencies, and more irregular frequency characteristics are shown since the operations of the electric power compartments are coupled with each other. Accordingly, it may be difficult to remove the noise due to the electric power compartments using the frequency for diagnosing the state of fuel cell by avoiding frequencies of a specific range.

Figure 1B:
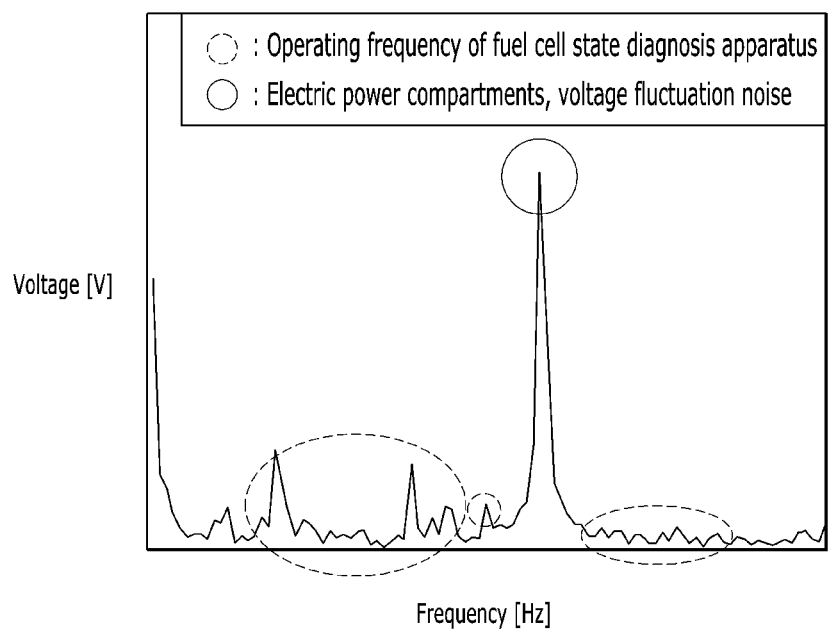

For example, FIGS. 1A-1B illustrate an example of operation frequency due to the conventional electric power compartments according to the related art. Referring to FIG. 1A, the noise due to the electric power compartments has the shape including specific peaks, and does not invade the frequency of diagnosing the state of fuel cell. On the contrary, in FIG. 1B, since the noise due to the electric power compartments has the band shape including the frequency of diagnosing the state of fuel cell, it may be difficult to remove the noise. Further, the noise due to the stack voltage fluctuation according to acceleration/deceleration of the vehicle has wide and strong spectrum on the characteristics, and the spectrum interferes in the frequency of diagnosing the state of fuel cell and degrades the reliability of diagnosing the state of fuel cell.

Figure 2:
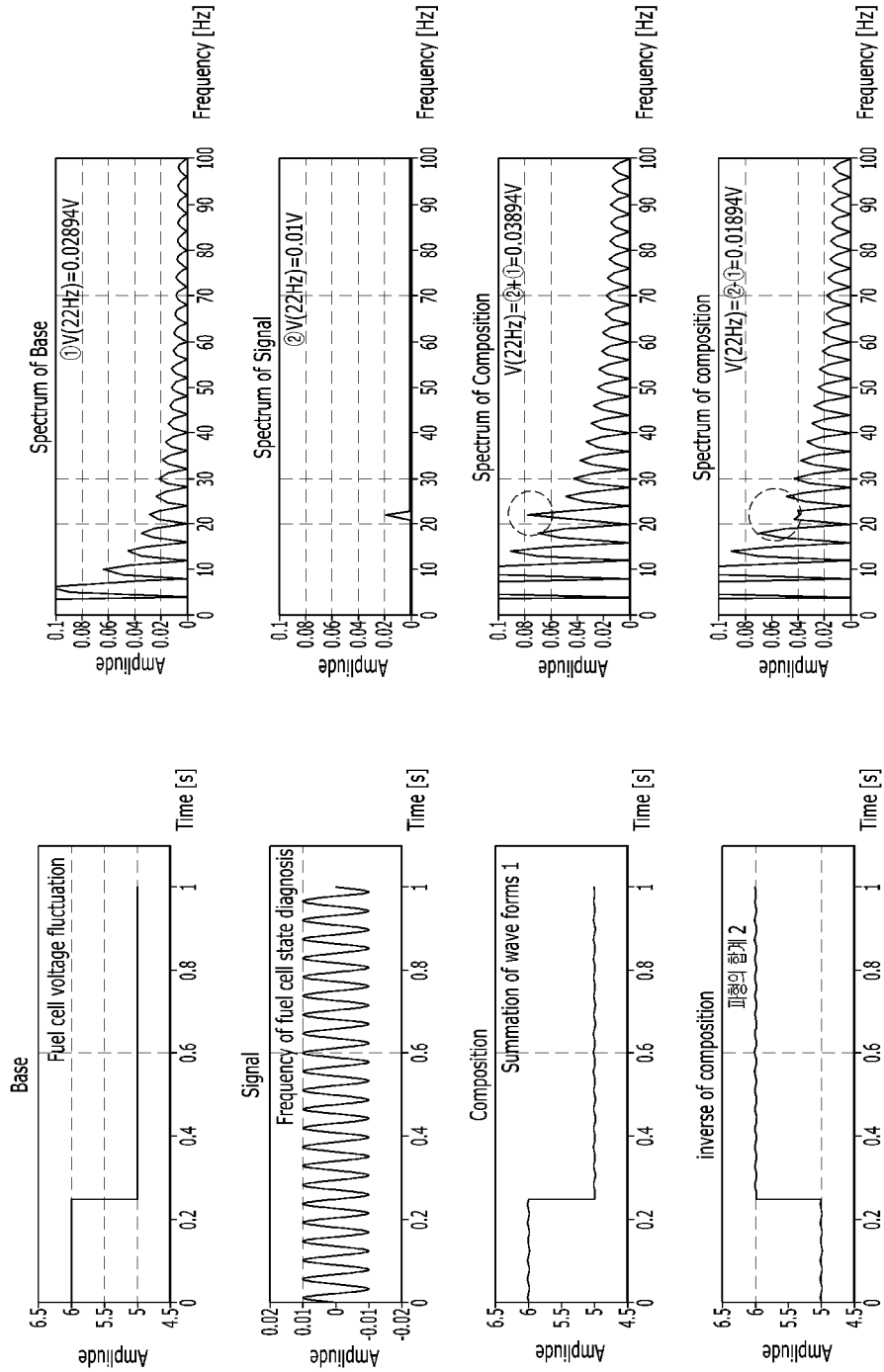
FIG. 2 is a graph illustrating the existing interference on the frequency of diagnosing the state of fuel cell according to acceleration/deceleration of the vehicle according to the related art.

For example, FIG. 2 is a graph illustrating the existing interference on the frequency of diagnosing the state of fuel cell according to acceleration/deceleration of the vehicle in the related art. Referring to FIG. 2, 0.01 V amplitude of the frequency of diagnosing the state of fuel cell of 22 Hz becomes 0.03894 V due to the constructive interference or 0.01894 V owing to the destructive interference since the noise due to the fuel cell voltage fluctuation is added. Accordingly, the interference due to the noise degrades the reliability of diagnosing the state of fuel cell.

Figure 3:
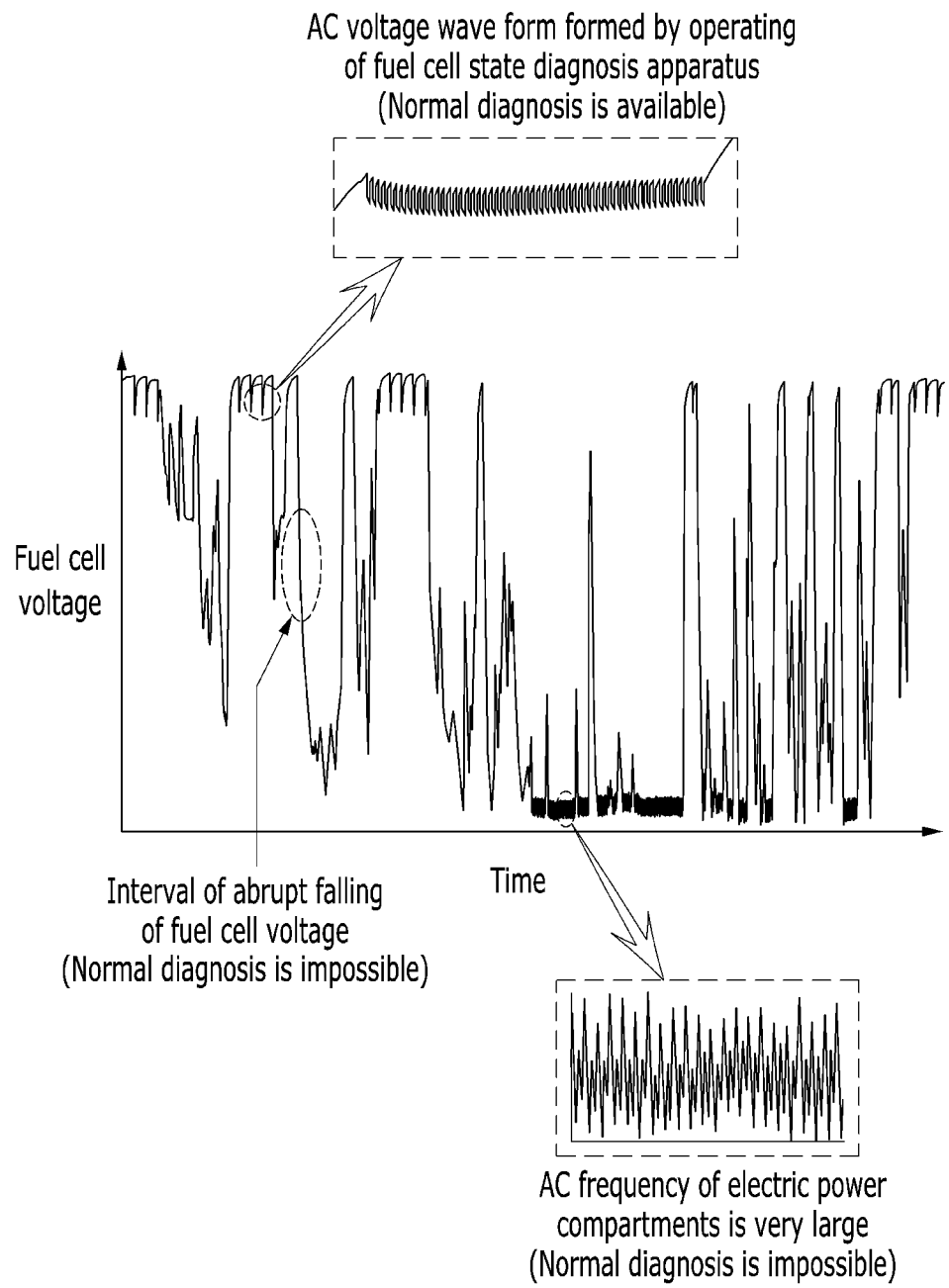
FIG. 3 illustrates the conventional measurement result of the fuel cell voltage in high speed when driving a fuel cell vehicle according to the related art.
Figure 4:
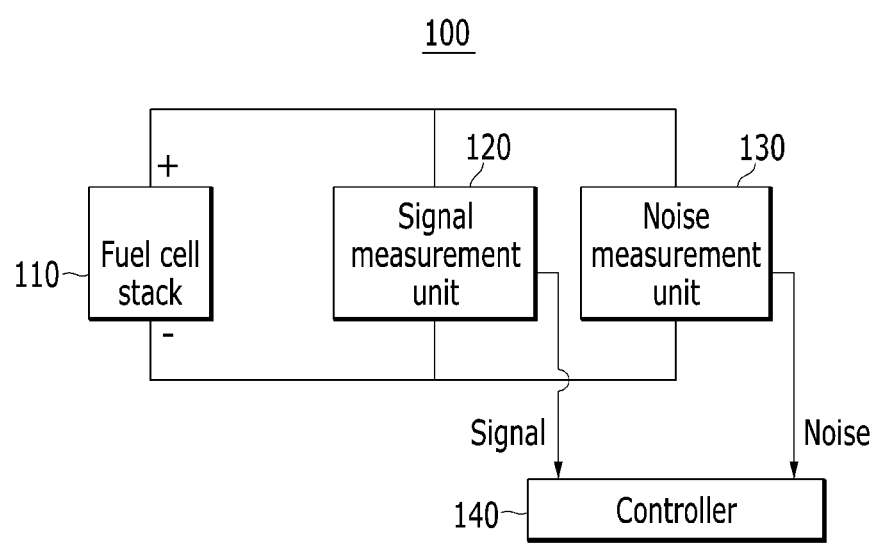
FIG. 4 is a block diagram schematically illustrating a construction of a fuel cell state diagnosis system according to an exemplary embodiment of the present invention.

Meanwhile, FIG. 3 illustrates the conventional measurement result of the fuel cell voltage when driving a fuel cell vehicle according to the related art. Referring to FIG. 3, the problems of the noise due to the electric power compartments and abrupt falling of the fuel cell voltage are observed in a real fuel cell vehicle. FIG. 4 is a block diagram schematically illustrating a construction of a fuel cell state diagnosis system according to an exemplary embodiment of the present invention. Referring to FIG. 4, the fuel cell state diagnosis system 100 according to an exemplary embodiment of the present invention may include a signal measurement unit 120, a noise measurement unit 130 and a controller 140. The controller 140 may be configured to operate the signal measurement unit 120 and the noise measurement unit 130.

In particular, the fuel cell 110 may be made up of a polymer electrolyte fuel cell. The signal measurement unit 120 may be configured to measure the voltage (hereinafter, referred to a first AC voltage) to determine the state diagnosis signal of a fuel cell stack 110. The noise measurement unit 130 may be configured to measure the voltage (hereinafter, referred to a second AC voltage) to detect noise. The controller 140 may be configured to execute overall operations of respective elements for fuel cell state diagnosis according to an exemplary embodiment of the present invention. In particular, the controller 140 may define the signal to noise ratio (SNR) of the state diagnosis data of fuel cell based on the AC voltage signals measured in the signal measurement unit 120 and the noise measurement 130, and may be configured to determine the reliability of fuel cell state diagnosis result based on the SNR value.

For example, the controller 140 may be configured to determine the state diagnosis data of fuel cell to be reliable when the SNR value calculated using the signal measurement unit 120 and the noise measurement unit 130 is greater than a predetermined reference value, and apply the state diagnosis data to the control (driving) of the fuel cell vehicle. Additionally, the controller 140 may be configured to discard the state diagnosis data when the SNR value is less the reference value. The the controller 140 may further be configured to determine the state diagnosis data of fuel cell to be reliable when the difference $V_{fc}$ between the maximum value and the minimum value among the fuel cell voltages measured using the noise measurement unit 130 is less than a predetermined reference deviation, and apply the state diagnosis data to the control (driving) of the fuel cell vehicle. The controller 140 may be configured to discard the state diagnosis data when the difference is less the reference deviation.

Figure 5A:
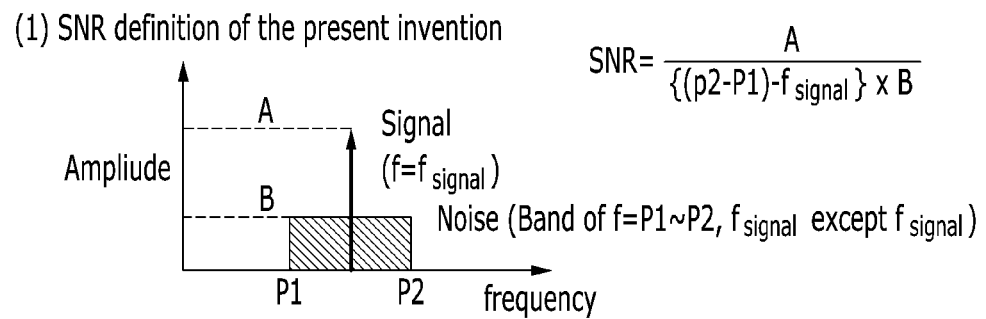
FIGS. 5A-5B illustrate the SNR defined according to an exemplary embodiment of the present invention which is compared with the conventional SNR.
Figure 5B:
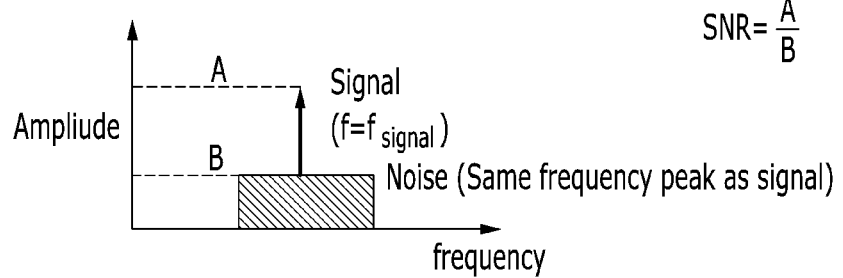

Meanwhile, FIGS. 5A-5B illustrate the SNR defined according to an exemplary embodiment of the present invention which is compared with the conventional SNR. Referring to FIGS. 5A-5B, the SNR according to an exemplary embodiment of the present invention is defined as Equation 2 below.

SNR=Amplitude($f_{signal}$)/Amplitude($f_{noise}$)

Signal=Amplitude($f_{signal}$),$f_{signal}$: Frequency of fuel cell state diagnosis signal Noise=Amplitude($f_{noise}$),$f_{noise}$: A~$f_{signal}$+Region of B (excluding $f_{signal}$)   Equation 2

In particular, the noise region of the noise measurement unit 130 is defined as the band neighboring the signal frequency except the state diagnosis signal frequency. Such a scheme of the SNR definition according to an exemplary embodiment of the present invention is distinguished from the SNR definition scheme in which the noise is defined in the same frequency of the signal shown in Equation 3 below.

Normal SNR=Amplitude($f_{signal}$)/Amplitude($f_{noise}$)

Signal=Amplitude($f_{signal}$), Measured in signal transmission unit

Noise=Amplitude($f_{noise}$), Measured in signal reception unit

Meanwhile, the fuel cell state diagnosis system 100 may further include a signal generation unit operated by the controller to apply AC current for diagnosis to the fuel cell 10. Accordingly, the controller 140 may be configured to diagnose the state of fuel cell and/or breakdown with improved reliability by determining whether to use the state diagnosis data based on the SNR value calculated using the respective AC voltages measured in the signal measurement unit 120 and the noise measurement unit 130 in the state that the current of the fuel cell stack 110 and the diagnosing AC current of the signal generation unit are overlapped and flow to a load (not shown).

Furthermore, the structure of the signal measurement unit 120 and the noise measurement unit 130 included in the voltage measurement device for improving the reliability of fuel cell state diagnosis of the fuel cell state diagnosis system 100 according to an exemplary embodiment of the present invention may be implemented to various shapes, and this will be described in detail through the various exemplary embodiments that will be described below.

First Exemplary Embodiment

Figure 6:
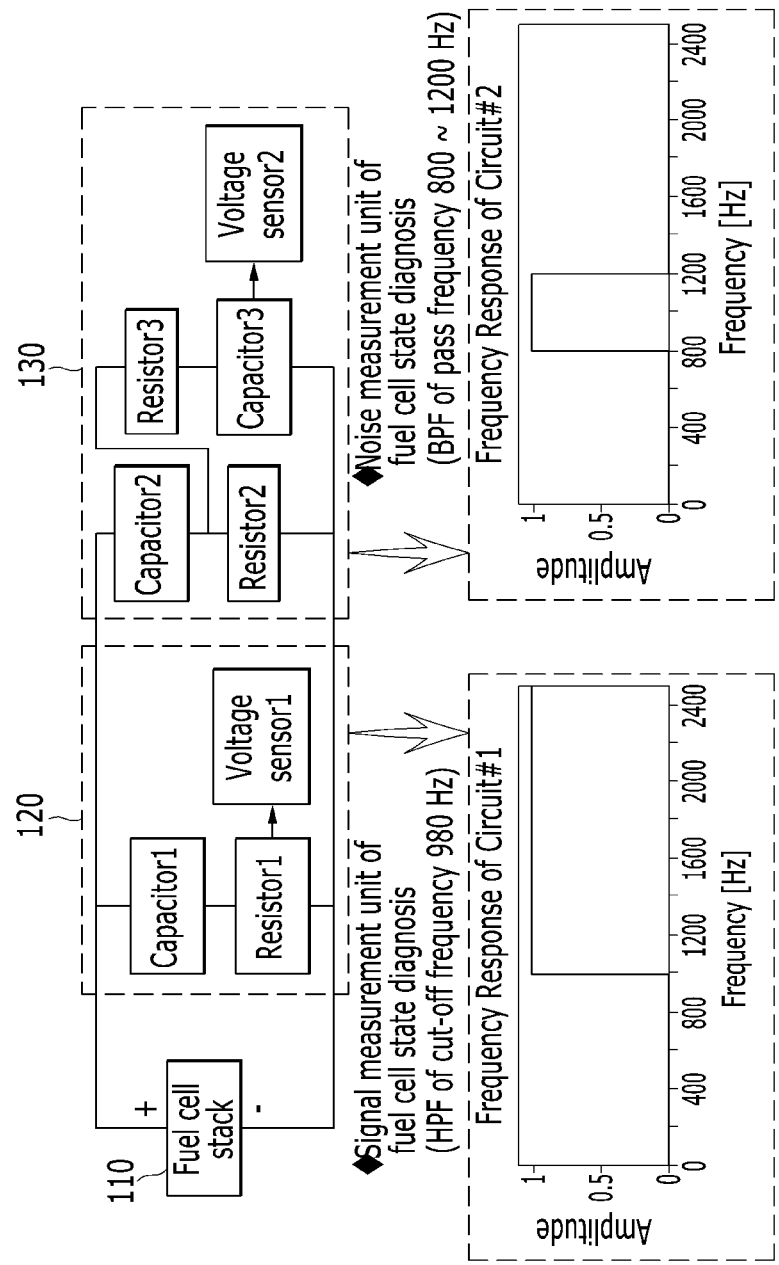
FIG. 6 is a block diagram illustrating a voltage measurement device for the fuel cell state diagnosis according to a first exemplary embodiment of the present invention.

FIG. 6 is a block diagram illustrating a voltage measurement device for the fuel cell state diagnosis according to a first exemplary embodiment of the present invention. Referring to FIG. 6, it may be assumed that the fuel cell state diagnosis frequency for the fuel cell state diagnosis according to the first exemplary embodiment of the present invention is about 1 kHz (e.g., a few hundreds to a few thousands Hz).

The signal measurement unit 120 may include a high pass filter (HPF) having a cut-off frequency of 980 Hz and a voltage measurement circuit, and may be configured to measure a first AC voltage to determine and measure the fuel cell state diagnosis signal. The noise measurement unit 130 may include a band pass filter (BPF) having a pass band of about 800~1200 Hz and a voltage measurement circuit, and may be configured to measure a second AC voltage to determine and measure the fuel cell state diagnosis noise. Since the configuration details of each of the elements in the fuel cell state diagnosis method using the voltage measurement device according to an exemplary embodiment of the present invention that will be described below may be integrated into a single fuel cell state diagnosis system 100, the fuel cell state diagnosis system 100 will be described mainly.

Figure 7:
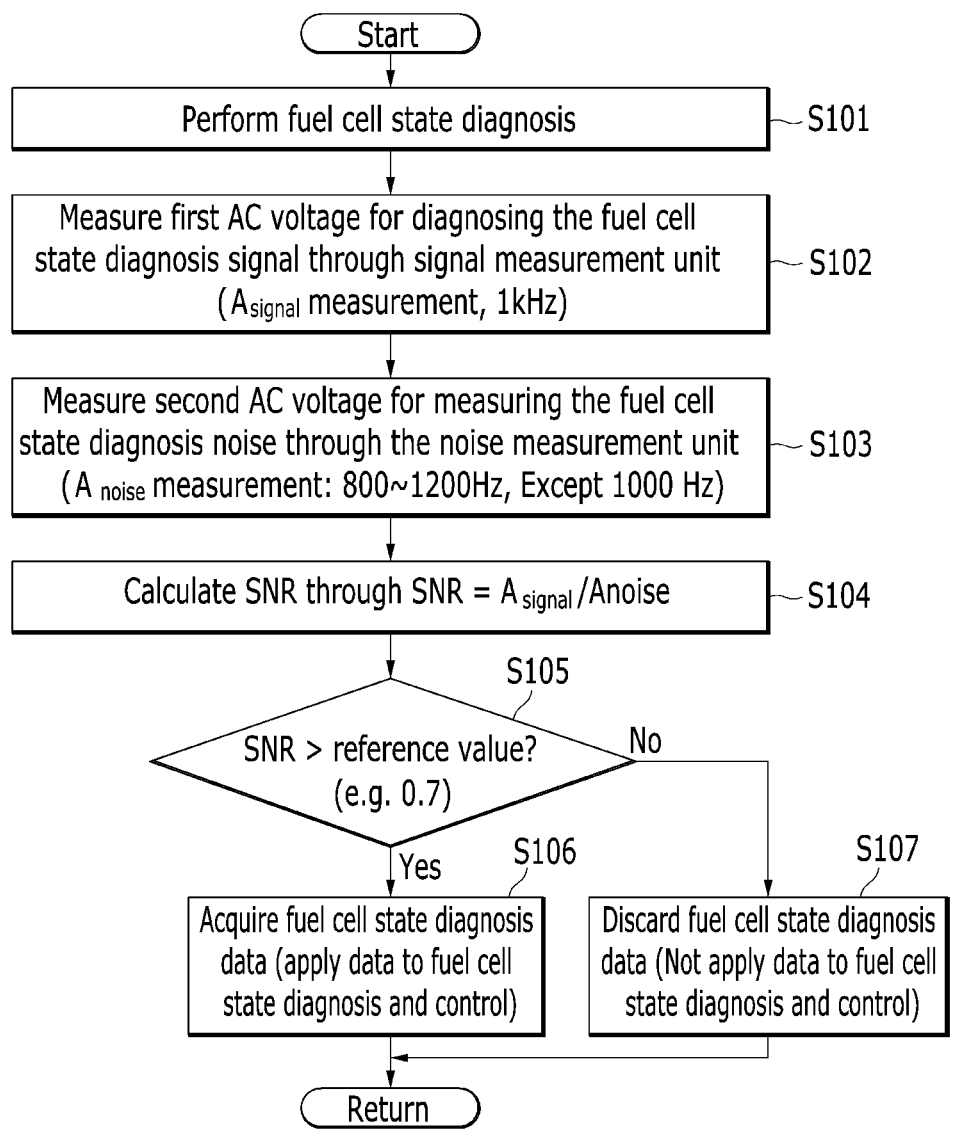
FIG. 7 is a flowchart illustrating a fuel cell state diagnosis method using a voltage measurement device according to the first exemplary embodiment of the present invention.

FIG. 7 is a flowchart illustrating a fuel cell state diagnosis method using a voltage measurement device according to the first exemplary embodiment of the present invention. Referring to FIG. 7, when the fuel cell state diagnosis is started (step, S101), the fuel cell state diagnosis system 100 may be configured to measure a first AC voltage for diagnosing the fuel cell state diagnosis signal of 1 kHz by collecting the fuel cell voltage signal of about 980 Hz or more using the signal measurement unit 120 (step, S102). The amplitude of 1 kHz of the signal measured in the signal measurement unit 120 may be defined as a signal region $A_{signal}$ (1 kHz).

In particular, since the cut-off frequency of about 980 Hz of the signal measurement unit 120 is about the same as the state diagnosis frequency 1 kHz in the frequency domain, the hum noise caused by the noise near to the state diagnosis frequency 1 kHz may be efficiently removed. The fuel cell state diagnosis system 100 may be configured to measure a second AC voltage to determine and measure the fuel cell state diagnosis noise of about 800~1200 Hz by collecting the fuel cell voltage signal of about 800~1200 Hz region using the noise measurement unit 130 (step, S103). The overall amplitude of 800~1200 Hz of the signal measured in the noise measurement unit 130 may be defined as a noise region $A_{noise}$ (800 Hz~1200 Hz, excluding 1000 Hz).

The fuel cell state diagnosis system 100 may be configured to calculate the SNR according to the signal region of the first AC voltage and the noise region of the second AC voltage that are measured above (step, S104). The SNR according to the signal region of the first AC voltage and the noise region of the second AC voltage may be calculated using Equation 2 above $$\left(SNR \doteq \frac{A_{signal}(1 \text{ kHz})}{A_{noise}(800 \text{ Hz} \sim 1200 \text{ Hz})}\right),$$

and the SNR value has values from 0 to 1.

The fuel cell state diagnosis system 100 may be configured to compare the calculated SNR value with a predetermined reference value (e.g., about 0.7). When the SNR value is greater than the reference value (Yes in step, S105), the fuel cell state diagnosis system 100 may be configured to determine the acquired fuel cell state diagnosis data to be reliable, and apply the data to the control of a fuel cell vehicle (e.g., to drive the vehicle) (step, S106). When the SNR value is less than the reference value (No in step, S105), the fuel cell state diagnosis system 100 may be configured to determine the corresponding fuel cell state diagnosis data to be unreliable, and may be configured to discard the data (step, S107). The fuel cell state diagnosis system 100 may repeat the procedure until the fuel cell state diagnosis is terminated by return.

Second Exemplary Embodiment

Figure 8:
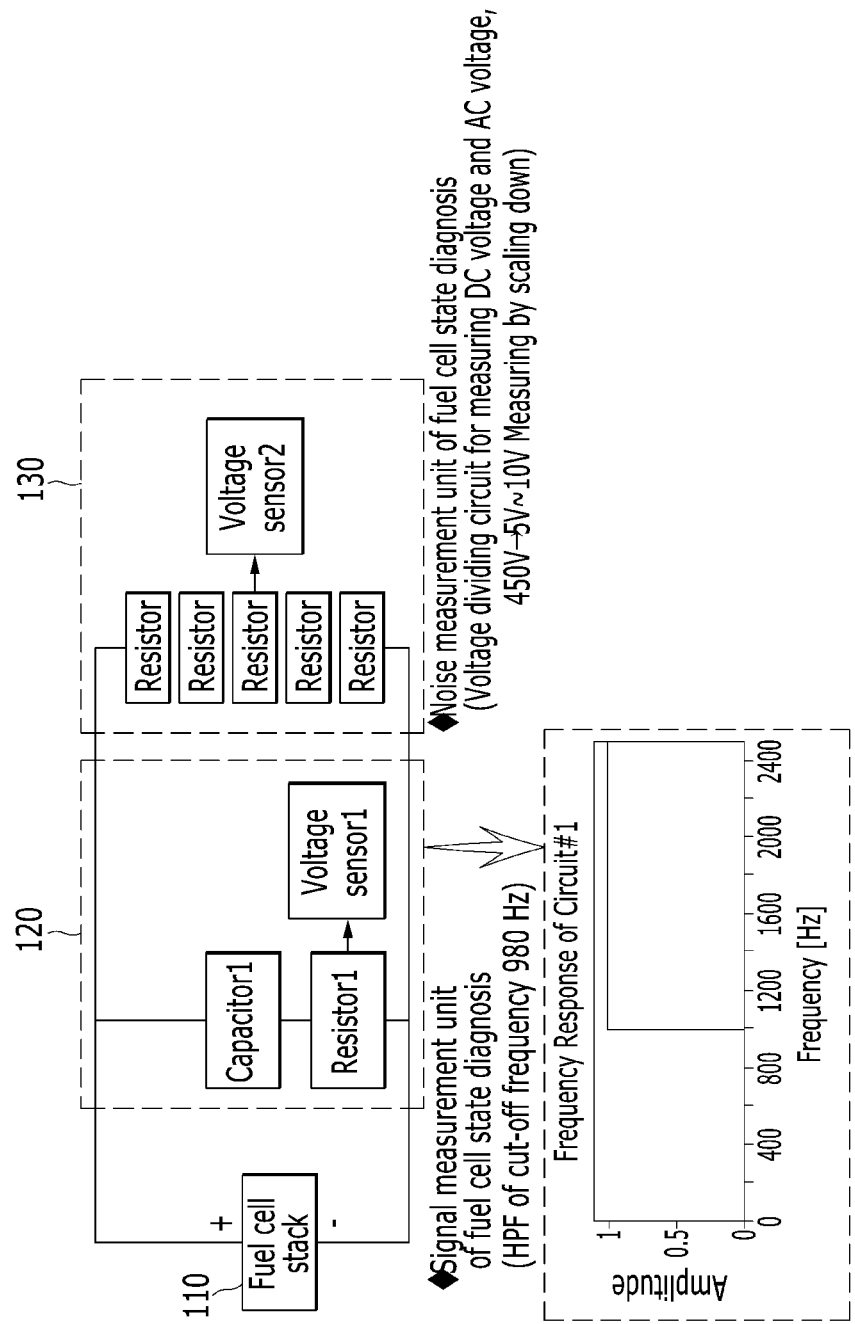
FIG. 8 is a block diagram illustrating a voltage measurement device for the fuel cell state diagnosis according to a second exemplary embodiment of the present invention.

Meanwhile, FIG. 8 is a block diagram illustrating a voltage measurement device for the fuel cell state diagnosis according to a second exemplary embodiment of the present invention. Referring to FIG. 8, it may be assumed that the fuel cell state diagnosis frequency for the fuel cell state diagnosis according to the second exemplary embodiment of the present invention is about 1 kHz (e.g., a few hundreds to a few thousands Hz).

The signal measurement unit 120 may include a HPF having a cut-off frequency of about 980 Hz and a voltage measurement circuit, and may be configured to measure a first AC voltage to determine and measure the fuel cell state diagnosis signal. The noise measurement unit 130 may be configured to measure the high voltage of the fuel cell stack 110 that is not directly measurable through a voltage dividing circuit in which a plurality of resistors are arranged in parallel, and may be configured to measure a second AC voltage to determine and measure the fuel cell state diagnosis signal. The noise measurement unit 130 is the voltage dividing circuit for measuring both of DC voltage and AC voltage, and may be configured to measure the high voltage of about 450 V by decreasing the voltage to about 5 V~10 V. In addition, the noise measurement unit 130 may be configured to measure the voltage deviation $V_{fc}$ that is the difference between the maximum voltage value and the minimum voltage value among the second AC voltage values measured through the voltage dividing circuit.

Figure 9:
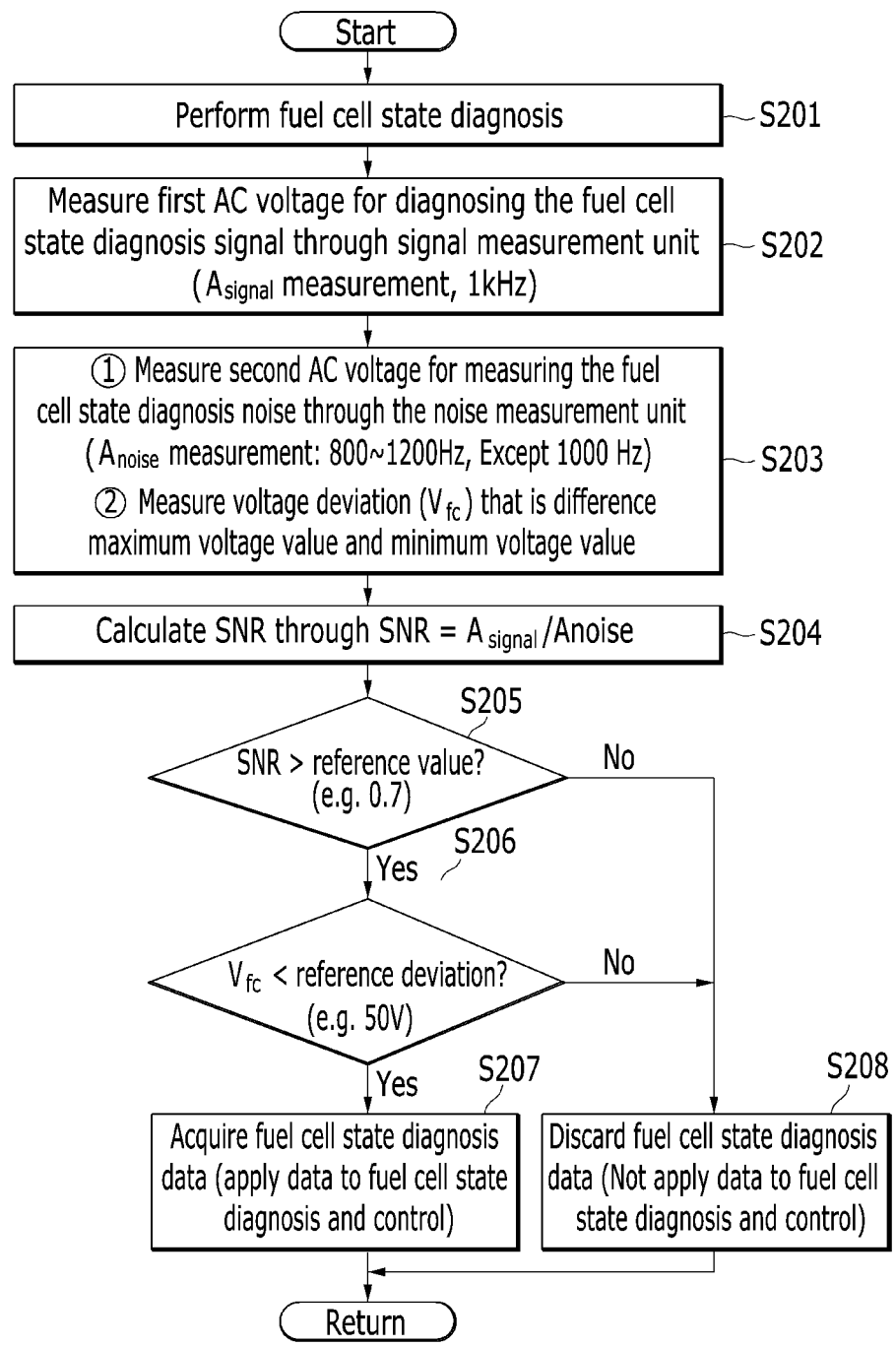
FIG. 9 is a flowchart illustrating a fuel cell state diagnosis method using a voltage measurement device according to the first exemplary embodiment of the present invention.

FIG. 9 is a flowchart illustrating a fuel cell state diagnosis method using a voltage measurement device according to the first exemplary embodiment of the present invention. Referring to FIG. 9, when the fuel cell state diagnosis is started (step, S201), the fuel cell state diagnosis system 100 may be configured to measure a first AC voltage for diagnosing the fuel cell state diagnosis signal of 1 kHz by collecting the fuel cell voltage signal of about 980 Hz or more using the signal measurement unit 120 (step, S202). The amplitude of 1 kHz of the signal measured in the signal measurement unit 120 may be defined as a signal region $A_{signal}$ (1 kHz).

In particular, since the cut-off frequency of about 980 Hz of the signal measurement unit 120 is about the same as the state diagnosis frequency 1 kHz in the frequency domain, the hum noise caused by the noise near to the state diagnosis frequency 1 kHz may be efficiently removed. The fuel cell state diagnosis system 100 may be configured to measure voltage of the fuel cell using the noise measurement unit 130 and perform a spectrum analysis, and measure a second AC voltage to determine and measure the fuel cell state diagnosis noise of a predetermined noise region (e.g., of about 800~1200 Hz) (step, S203). The overall amplitude in the predetermined noise region may be defined as a noise region $A_{noise}$ (800 Hz~1200 Hz, excluding 1000 Hz).

In particular, the noise measurement unit 130 may be configured to measure the voltage deviation $V_{fc}$ that is the difference between the maximum voltage value and the minimum voltage value among measured voltages of fuel cell. The fuel cell state diagnosis system 100 may be configured to calculate the SNR according to the signal region of the first AC voltage and the noise region of the second AC voltage that are measured above (step, S204). The SNR according to the signal region of the first AC voltage and the noise region of the second AC voltage may be calculated using Equation 2 above $$\left(SNR \doteq \frac{A_{signal}(1 \text{ kHz})}{A_{noise}(800 \text{ Hz} \sim 1200 \text{ Hz})}\right),$$

and the SNR value has values from 0 to 1.

When the calculated SNR value is greater than a predetermined reference value (e.g., about 0.7) (Yes in step, S205) and the voltage deviation $V_{fc}$ is less than a predetermined reference deviation (e.g., about 50 V) (Yes in step, S206), the fuel cell state diagnosis system 100 may be configured to determine the acquired fuel cell state diagnosis data to be reliable (step, S207). In other words, the fuel cell state diagnosis system 100 may be configured to determine the fuel cell state diagnosis data to be reliable when both of the condition that the signal for fuel cell diagnosis and the SNR value is greater than the predetermined reference value and the condition that the voltage deviation $V_{fc}$ is less than the predetermined reference deviation are satisfied.

Furthermore, when the SNR value is less than the reference value (No in step, S205) or the voltage deviation $V_{fc}$ exceeds the predetermined reference deviation (No in step, S206), the fuel cell state diagnosis system 100 may be configured to determine the corresponding fuel cell state diagnosis data to be unreliable, and may be configured to discard the data (step, S208). The fuel cell state diagnosis system 100 may repeat the procedure until the fuel cell state diagnosis is terminated by return.

Third Exemplary Embodiment

Figure 10:
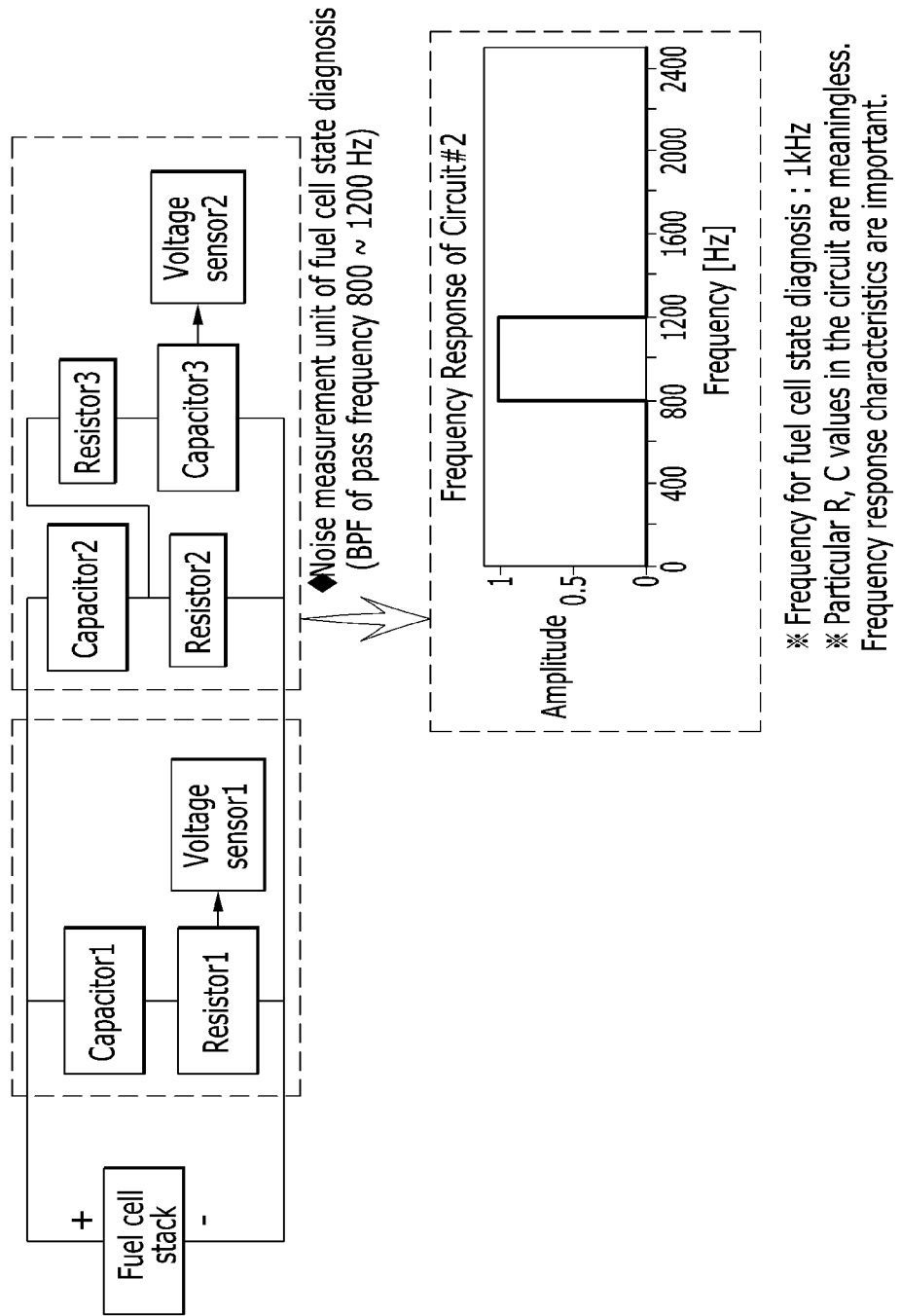
FIG. 10 is a block diagram illustrating a voltage measurement device for the fuel cell state diagnosis according to a third exemplary embodiment of the present invention.

FIG. 10 is a block diagram illustrating a voltage measurement device for the fuel cell state diagnosis according to a third exemplary embodiment of the present invention. Referring to FIG. 10, the third exemplary embodiment of the present invention is similar to the first exemplary embodiment, but different in that the signal measurement and the noise measurement are performed using a single integrated measurement unit 150. In the description below, it may be assumed that the fuel cell state diagnosis frequency for the fuel cell state diagnosis is 1 kHz (e.g., a few hundreds to a few thousands Hz). The integrated measurement unit 150 may include a BPF having a pass band of about 800~1200 Hz and a voltage measurement circuit, and may be configured to measure a first AC voltage to determine and measure the fuel cell state diagnosis signal and a second AC voltage to determine and measure the fuel cell state diagnosis noise.

Figure 11:
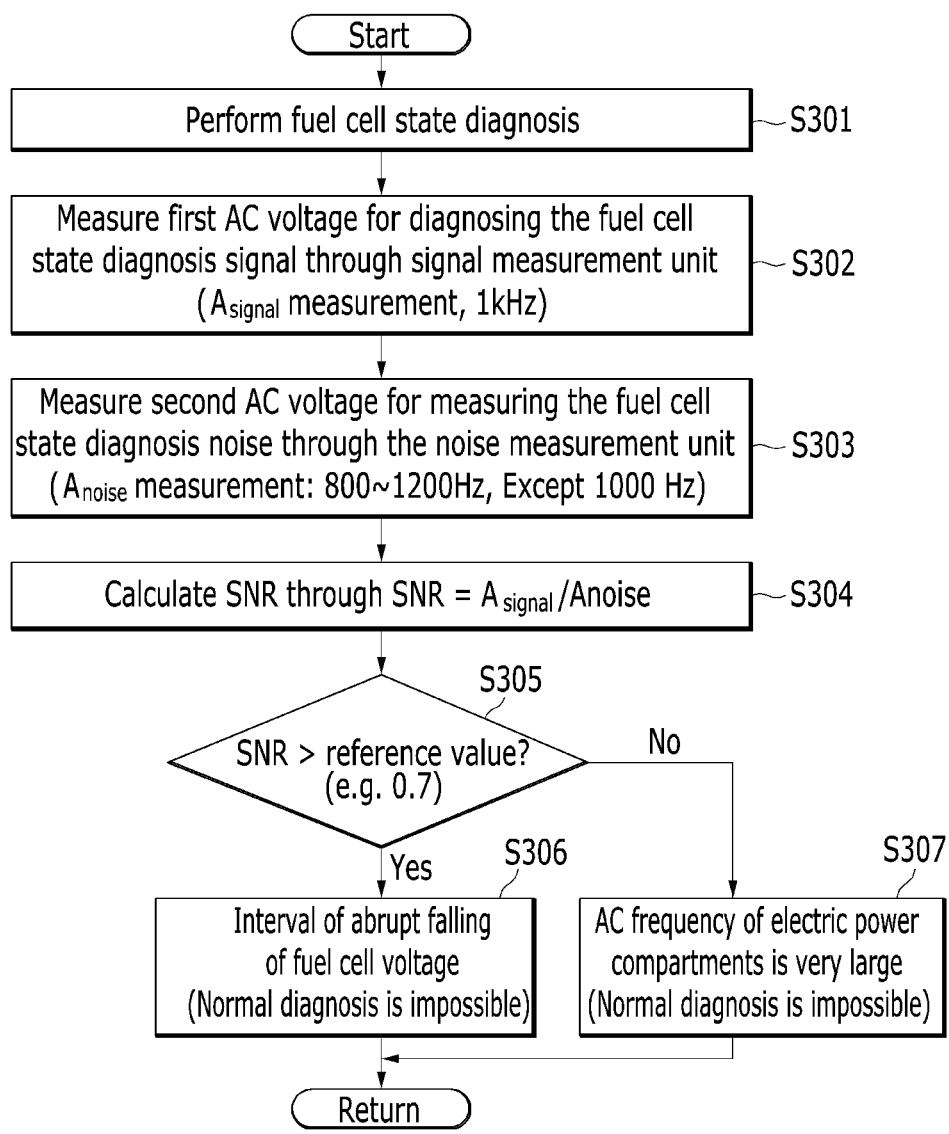
FIG. 11 is a flowchart illustrating a fuel cell state diagnosis method using a voltage measurement device according to the third exemplary embodiment of the present invention.

Meanwhile, FIG. 11 is a flowchart illustrating a fuel cell state diagnosis method using a voltage measurement device according to the third exemplary embodiment of the present invention. Referring to FIG. 11, when the fuel cell state diagnosis is started (step, S301), the fuel cell state diagnosis system 100 may be configured to measure a first AC voltage to diagnose the fuel cell state diagnosis signal of 1 kHz by collecting the fuel cell voltage signal using the integrated measurement unit 150 (step, S302). The amplitude of 1 kHz of the signal measured in the integrated measurement unit 150 may be defined as a signal region $A_{signal}$ (1 kHz).

The fuel cell state diagnosis system 100 may be configured to measure a second AC voltage to diagnose the fuel cell state diagnosis noise in the fuel cell voltage signal of about 800~1200 Hz region using the integrated measurement unit 150 (step, S303). In particular, the overall amplitude of about 800~1200 Hz of the signal measured in the integrated measurement unit 150 may be defined as a noise region $A_{noise}$ (800 Hz~1200 Hz, excluding 1000 Hz). The fuel cell state diagnosis system 100 may be configured to calculate the SNR according to the signal region of the first AC voltage and the noise region of the second AC voltage that are measured above (step, S304). The SNR according to the signal region of the first AC voltage and the noise region of the second AC voltage may be calculated using Equation 2 above $$\left(SNR \doteq \frac{A_{signal}(1 \text{ kHz})}{A_{noise}(800 \text{ Hz} \sim 1200 \text{ Hz})}\right),$$

and the SNR value has values from 0 to 1.

The fuel cell state diagnosis system 100 may then be configured to compare the calculated SNR value with a predetermined reference value (e.g., about 0.7). When the SNR value is greater than the reference value (Yes in step, S305), the fuel cell state diagnosis system 100 may be configured to determine the acquired fuel cell state diagnosis data to be reliable and acquire the data, and apply the data to the control of a fuel cell vehicle (step, S306). When the SNR value is less than the reference value (No in step, S305), the fuel cell state diagnosis system 100 may be configured to determine the corresponding fuel cell state diagnosis data to be unreliable, and discard the data (step, S307). The fuel cell state diagnosis system 100 may repeat the procedure until the fuel cell state diagnosis is terminated by return.

Various exemplary embodiments of the present invention are described so far, but the present invention is not limited to the exemplary embodiments described above, the substitution or the modification between the exemplary embodiments is also available. For example, in the second exemplary embodiment, is the system may be determined to be reliable when the state diagnosis data satisfies the condition that the voltage deviation $V_{fc}$ is less than the predetermined reference deviation, and this determination may also be applied to other exemplary embodiments. Accordingly, there is a merit of removing the noise that makes the normal diagnosis impossible in the interval where the fuel cell voltage is rapidly changed.

Figure 12A:
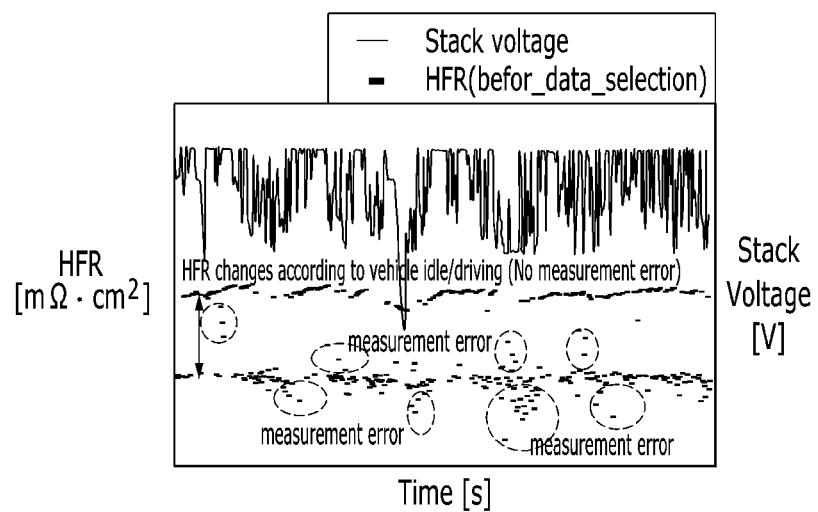
FIGS. 12A-12B illustrate an operational effect of a voltage measurement device according to an exemplary embodiment of the present invention.
Figure 12B:
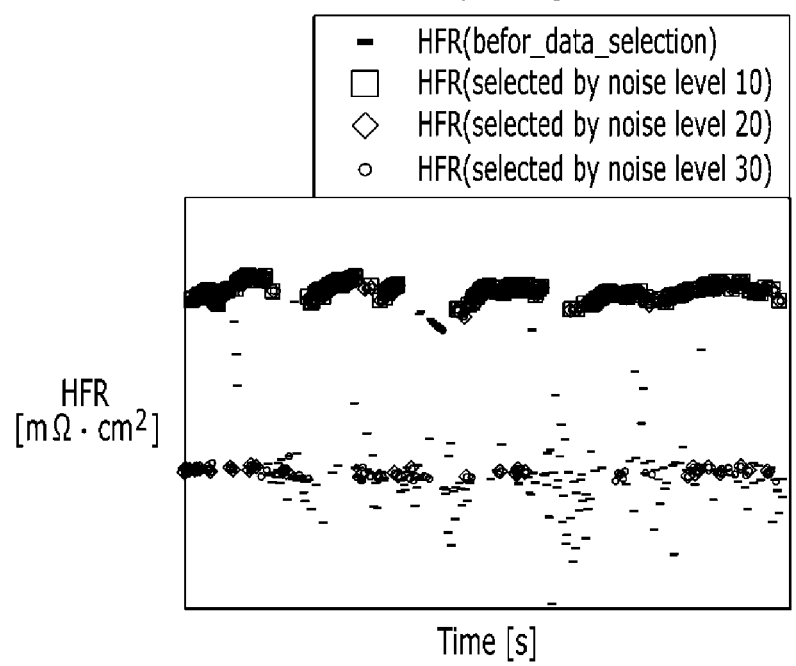

Meanwhile, FIGS. 12A-12B illustrate an operational effect of a voltage measurement device according to an exemplary embodiment of the present invention. Referring to FIG. 12A, in the graph when the present invention is not applied, there are very drastic measurement deviation in the impedance measurement owing to the problem of operating frequencies mixture of fuel cell vehicle electric compartments (operating frequency of fuel cell state diagnosis apparatus—about 500 Hz, operating frequency of fuel cell vehicle electric compartments—about 400~600 Hz) and the problem that the state diagnosis apparatus frequency is buried when the fuel cell voltage is rapidly changed.

Further, referring to FIG. 12B, in the graph when the exemplary embodiments of the present invention are applied, the effect of removing the impedance measurement deviation may be identified by acquiring only the state diagnosis data of which signal to noise ratio is greater than a predetermined value. Accordingly, the reliability of fuel cell state diagnosis may be improved by calculating the SNR value of the fuel cell state diagnosis data which are calculated using the respective measurement voltages of the signal measurement unit and the noise measurement unit and applying the state diagnosis data to the vehicle diagnosis and control when the SNR value is greater than a predetermined value. In addition, the noise affecting the normal diagnosis may be removed by determining the state diagnosis data that satisfies the condition that the voltage deviation of the noise is less than the predetermined reference deviation to be reliable.

The exemplary embodiments of the present invention are not only implemented through the apparatus and/or method described above, but may be implemented through a program for realizing the function that corresponds to the elements of the exemplary embodiments of the present invention, a medium in which the program is stored, and so on. And such an implementation may be easily done by a skilled person in the art from the description of the exemplary embodiments. While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A method for diagnosing a state of fuel cell by a system for diagnosing a state of fuel cell, comprising:
   measuring, by a controller, a first alternating current (AC) voltage to measure the fuel cell state diagnosis signal by collecting fuel cell voltage signals greater than a predetermined cut-off frequency;
   measuring, by the controller, a second AC voltage to measure the fuel cell state diagnosis noise by collecting fuel cell voltage signals of a predetermined pass band;
   calculating, by the controller, a signal to noise ratio (SNR) of fuel cell state diagnosis data based on a signal region of the first AC voltage and a noise region of the second AC voltage; and
   determining, by the controller, the corresponding fuel cell state diagnosis data to be reliable when the SNR value is greater than a predetermined reference value, and applying the fuel cell state diagnosis data to a control of a fuel cell vehicle, wherein in the calculating of the signal to noise ratio (SNR) of fuel cell state diagnosis data the SNR is calculated by defining the band neighboring the signal frequency except the fuel cell state diagnosis signal frequency to be the noise region.

2. The method for diagnosing a state of fuel cell of claim 1, further comprising:
measuring, by the controller, a voltage deviation that is a difference between a maximum voltage value and a minimum voltage value among the second AC voltage values.

3. The method for diagnosing a state of fuel cell of claim 2, further comprising:
comparing, by the controller, the voltage deviation with a predetermined reference deviation while the SNR value is greater than the predetermined reference value; and
determining, by the controller, the corresponding fuel cell state diagnosis data to be reliable when the voltage deviation is less than the predetermined reference deviation.

4. The method for diagnosing a state of fuel cell of claim 1, further comprising:
discarding, by the controller, the fuel cell state diagnosis data when the SNR value is less than the reference value.

* * * * *